United States Patent

Heyden

[11] Patent Number: 4,597,317
[45] Date of Patent: Jul. 1, 1986

[54] QUICK CHANGE CUTTING CYLINDER ARRANGEMENT

[75] Inventor: Günter Heyden, Neuwied, Fed. Rep. of Germany

[73] Assignee: Winkler & Dunnebier Maschinenfabrik und Eisengiesserei GmbH & Co. KG, Neuwied, Fed. Rep. of Germany

[21] Appl. No.: 565,466

[22] Filed: Dec. 27, 1983

[51] Int. Cl.⁴ .............................................. B26D 1/62
[52] U.S. Cl. ...................................... 83/346; 83/481; 83/663; 83/911
[58] Field of Search ................. 83/346, 347, 348, 481, 83/658, 659, 663, 664, 665, 667, 911; 72/237, 238

[56] References Cited

U.S. PATENT DOCUMENTS

| | | | |
|---|---|---|---|
| 1,782,894 | 11/1930 | Grueter | 83/481 |
| 3,528,334 | 9/1970 | Geschwender | 83/346 |
| 3,545,326 | 12/1970 | Madachy | 83/481 |
| 3,727,503 | 4/1973 | Braner et al. | 83/481 |
| 4,368,633 | 1/1983 | Nogota | 72/238 |

*Primary Examiner*—Frank T. Yost
*Assistant Examiner*—Hien H. Phan
*Attorney, Agent, or Firm*—Collard, Roe & Galgano

[57] ABSTRACT

A quick change cutting cylinder for letter envelope and hygiene machines is provided wherein the cylinder is rotatably received on both its sides with conical cylinder journals on the end faces thereof coaxially in respective bearing units which run with pretensioned precision anti-friction bearings with great radial and axial stiffness without play, and which are locked on a common parallel guide by means of fast-acting clamping devices.

5 Claims, 3 Drawing Figures

4,597,317

QUICK CHANGE CUTTING CYLINDER ARRANGEMENT

BACKGROUND OF THE INVENTION

1. Field of the Invention

The invention relates to a quick change cutting cylinder arrangement for letter envelope and hygiene machines, where the cutting cylinder is bolted to a left and a right bearing unit in a form-locking manner.

In paper converting and hygiene machines, i.e. machines which produce articles such as sanitary napkins, disposable diapers, handkerchiefs, table napkins, etc., it is often necessary to change certain cylinders, particularly those cylinders which depend on format when that format is changed. In this connection, it is necessary, on the one hand, that each cylinder run exactly true by reason of a qualitatively good bearing support and, on the other hand, that it can be exchanged with another with a minimum expenditure of time and labor.

2. Description of the Prior Art

It is known to equip cylinders of this type, particularly cutting and formatting cylinders, with cylindrical bearing journals on both sides, on which anti-friction radial bearings and possibly vacuum air control valves are disposed and secured axially. To ensure that such cylinders run free of play and radial imbalance, pretensioning bearings are arranged on the bearing journals axially beside the main bearings serving to take up the bearing forces. The bearing play of the main bearings is pushed out here by pretensioning forces to one side by means of the pretensioning bearings; see DE-OS No. 27 50 530 and DE-OS No. 29 12 458. The possibility to change cylinders results from the fact that the main bearings of the cylinders are received at divided bearing positions.

Cylinder bearings of this type have economic as well as technical disadvantages. The main bearings and the pretensioning bearings are part of the supply schedule of the cylinders, although the cylinders, being cutting and formatting cylinders, are parts subject to wear. If repairs on a cylinder are required, for instance for re-grinding a cutting cylinder, the old main and pretensioning bearings must be pulled off before such reconditioning can begin and must be replaced by new bearings when the work is completed. This increases the cost of reconditioning work considerably. Since the main and pretensioning bearings are arranged axially side by side on the respective cylinder journal on the end face, the cylinder is bent by the pretensioning force which causes a torque by means of the lever arm of the distance from the main and pretensioning bearing. A further disadvantage resides also in that the divided support positions which, first, provide no exact and accurate seating of the cylinder bearings and, second, do not permit a rapid exchange of cylinders. In addition, the overall length of the cylinder is increased since the main and pretensioning bearings as well as usually a vacuum air valve on one side are arranged on their journal at the end face. This is reflected in higher material and manufacturing costs.

SUMMARY OF THE INVENTION

It is an object of the present invention to develop a precision cylinder bearing system which permits a rapid exchange of cylinders and avoids the described disadvantages of the state of the art.

According to the present invention, this object, as well as others which will hereinafter become apparent, is accomplished by providing a cutting cylinder at both its end faces with coaxially arranged conical cylinder journals having an axial and centered internal thread, and each of the two bearing units with axially pretensioned precision anti-friction bearings without axial and radial bearing play, the bearing units being held movably on a common parallel guide. Each bearing unit is equipped on its rotating shaft with an internal cone for the form-locking reception of the corresponding conical cylinder journal. Each rotating shaft has a central through bore, through which a bolt threadably engages the cylinder with its corresponding conical cylinder journals fitted into the internal cone of the rotating shaft to form an integral unit, coaxially with the bearing unit.

In order to maintain the overall length of the cylinder as small as possible and to facilitate the replacement of cylinders, the cone shapes are realized as short and steep cones. The anti-friction bearings used in the bearing units are angular-contact ball bearings which, in running, develop little heat even in the pretensioned condition. For exact guidance, the bearing units are held movably on a dove-tail slide by means of fast-acting clamping devices.

The advantages achieved with the present invention are, in particular, that the bearing units with their parallel guide are part of the basic equipment of the paper converting or the hygiene machine and, since anti-friction bearings are not part of the supply schedule of the cylinders, the cylinders become simpler, and being parts subject to wear and can be reconditioned more easily.

It is equally advantageous that the overall length and weight are reduced, thus facilitating the replacement of cylinders in conjunction with the conical receptacles at the end faces and shortening the change-over time considerably. A further advantage is that the bearing units are equipped with axially pretensioned angular-contact ball bearings, which give the bearing system very great radial and axial stiffness, scarcely produce heating in the bearings and allow no radial or axial bearing play to develop. The assembled cylinder forms a solid rigid unit with the bearing units and the dove-tail guide.

BRIEF DESCRIPTION OF THE DRAWINGS

The present invention will be described and understood more readily when considered together with the accompanying drawings, in which.

DESCRIPTION OF THE PREFERRED EMBODIMENT

Figure 1:
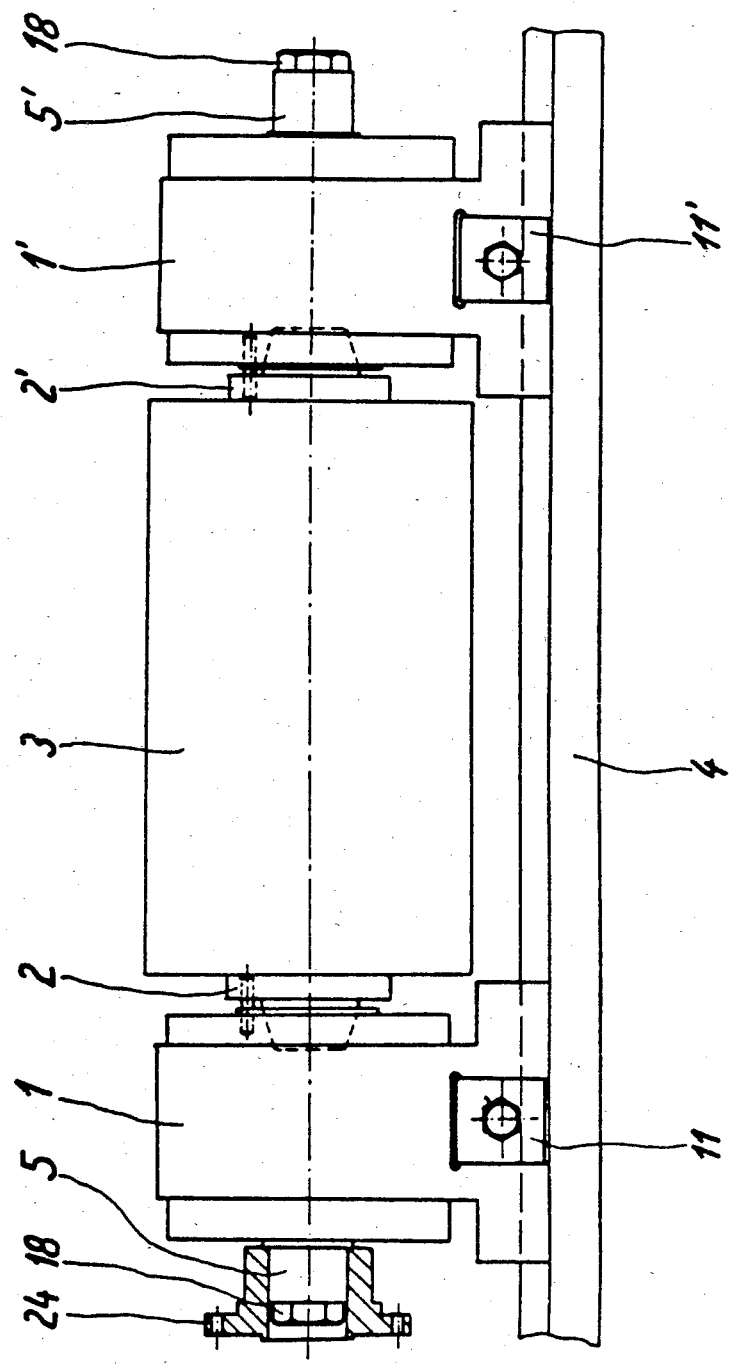
FIG. 1 is a front elevational schematic view of the cylinder bearing support and quick change device of the present invention.

Now turning to the drawings, there is shown in FIG. 1 a complete cylinder bearing support and quick change arrangement according to the present invention. As can be seen, cylinder 3 is arranged between bearing units 1 and 1' and is received at its conical cylinder journals 2 and 2' at its end faces by the bearing units in a form-locking and rotatable manner. The cylinder is firmly bolted to the bearing units by means of bolts 18 (see also FIG. 3). Rotary motion is transmitted from the paper converting or hygiene machine by drive elements (not shown) to cylinder 3 via drive flange 24 and rotating shafts 5 and 5'. Bearing units 1 and 1', which are bolted to cylinder 3, are held movably on common parallel guide 4 by their fast-acting clamping devices 11 and 11'.

Figure 2:
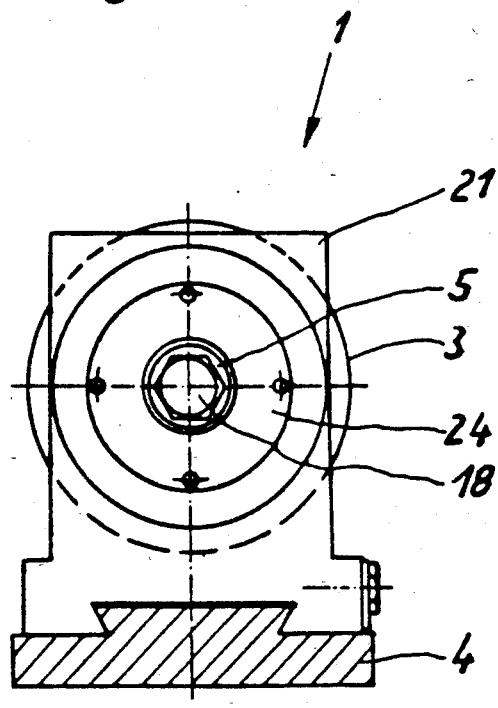
FIG. 2 is a side elevational schematic view of the cylinder bearing support and quick change device with the guide shown in cross section.

The central arrangement of bolt 18 relative to cylinder 3 and shaft 5 and the design of parallel guide 4 as a dove-tail slide can be seen clearly in FIG. 2.

Figure 3:
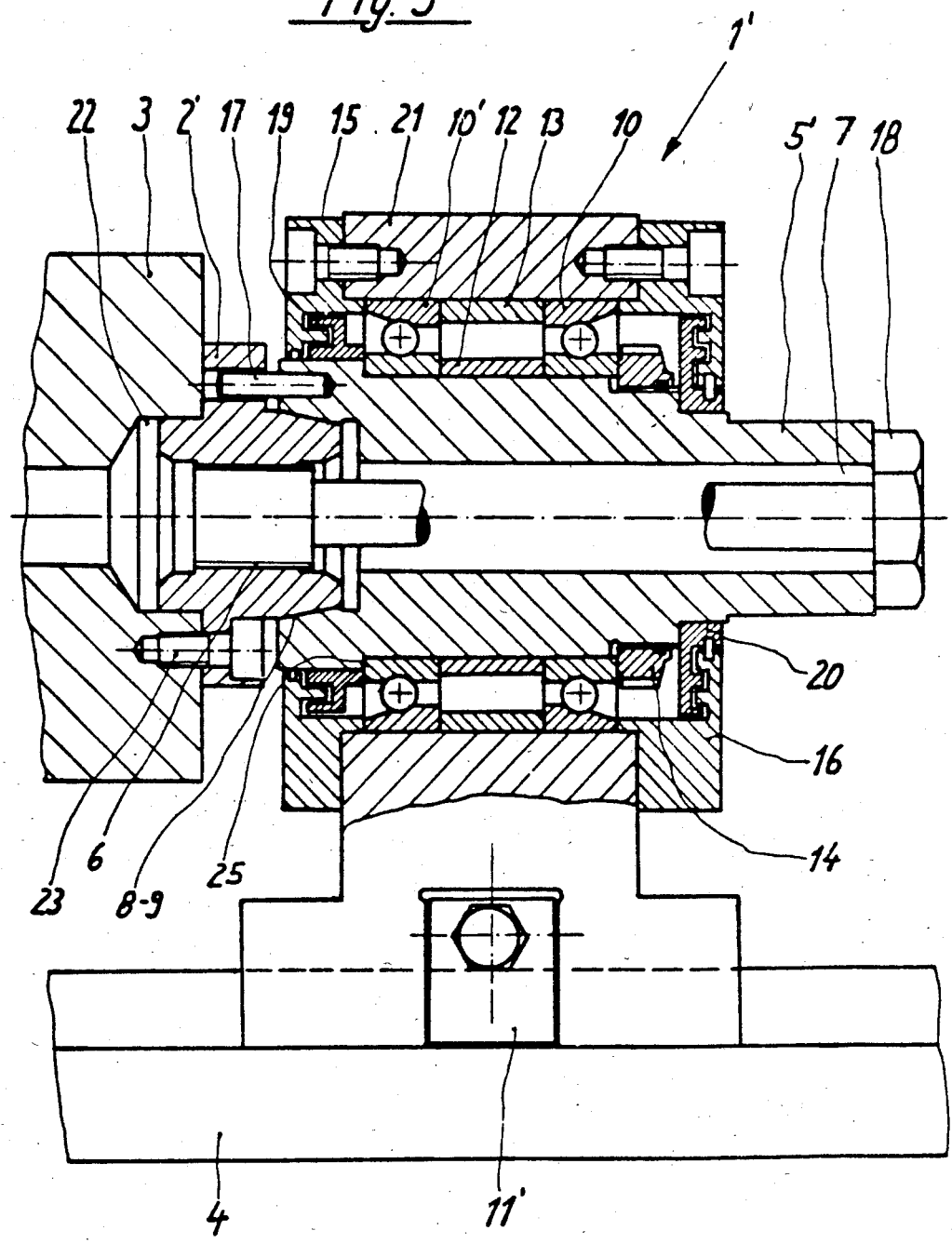
FIG. 3 is a cross-sectional view of a bearing unit according to the present invention.

The design of bearing unit 1' is seen clearly in FIG. 3. As can be seen, bearing housing 21 is fastened on parallel guide 4 by means of fast-acting clamping device 11'. Shaft 5' is supported rotatably by means of the angular-contact ball bearings 10 and 10' in such a manner that the center of shaft 5' extends parallel to and aligned with parallel guide 4. Angular-contact ball bearings 10 and 10' are clamped together with their outer rings by means of labyrinth covers 15 and 16 and a spacer bushing 13 and are thereby locked in bearing housing 21. Rotating shaft 5' is axially clamped by means of shoulder 25, spacer ring 12 and self-locking slot nut 14 to the angular-contact ball bearings 10 and 10'. Bearing unit 1' is axially sealed by labyrinth ring 19 and labyrinth washer 20 which are centrally supported on rotating shaft 5' and nested in labyrinth covers 15 and 16. Conical cylinder journal 2' of cylinder 3 is received with its external cone 9 in the internal cone 8 of rotating shaft 5' in a form-locking manner and threadingly receives by means of internal thread 6 bolt 18 passing through central bore 7 of shaft 5'. Cylinder journal 2' is centered in bore 22 of cylinder 3 and bolted to the end face of cylinder 3 by means of bolts 23.

Positioning pin 17 serves to ensure that the internal cone 8 of rotating shaft 5' and the external cone 9 of cylinder journal 2' are always secured together in the same relative position to one another.

It is understood that the foregoing general and detailed descriptions are explanatory of the present invention and are not to be interpreted as restrictive of the scope of the following claims.

What is claimed is:

1. A quick change cutting cylinder arrangement for letter envelope and hygiene machines wherein the cutting cylinder is bolted in a form-locking manner to a left and a right bearing unit, the arrangement comprising:
    (a) a cutting cylinder having at both its end faces coaxially arranged conical cylinder journals;
    (b) a bearing unit having a rotating shaft for each end face of said cutting cylinder, each bearing unit having in its rotating shaft an internal conical shape complementary to said conical cylinder journals for receiving the same and having axially pretensioned precision anti-friction bearings without axial or radial bearing play;
    (c) means form-locking said bearing units to said conical cylinder journals including an axial through bore in each rotating shaft through which passes a bolt for threadable axial engagement with each said conical cylinder journal for securement therebetween;
    (d) means for rotatably positioning each of said conical cylinder journals with respect to the rotating shaft of the respective bearing unit comprising a positioning pin extending between each conical cylinder journal and the rotating shaft of the respective bearing unit; and
    (e) means for mounting said bearing units for precise axial sliding movement on a common parallel guide including fast-acting clamping devices so that changing of said cutting cylinder is thereby facilitated.

2. The quick change cutting cylinder arrangement according to claim 1, wherein the conical shapes of the cylinder journals and the rotating shafts of the bearing units are short and steep cones.

3. The quick change cutting cylinder arrangement according to claim 1, wherein the conical cylinder journals are flanged coaxially to the cylinder at the end faces thereof.

4. The quick change cutting cylinder arrangement according to claim 1, wherein the axially pretensioned precision anti-friction bearings are angular-contact ball bearings.

5. The quick change cutting cylinder arrangement according to claim 1, wherein the parallel guide is a dove-tail slide on which the bearing units are held movably by means of fast-acting clamping devices.

* * * * *